United States Patent
Ono et al.

(10) Patent No.: US 10,494,725 B2
(45) Date of Patent: Dec. 3, 2019

(54) ELECTROCHEMICAL REACTION DEVICE

(71) Applicant: KABUSHIKI KAISHA TOSHIBA, Minato-ku (JP)

(72) Inventors: Akihiko Ono, Kita (JP); Satoshi Mikoshiba, Yamato (JP); Yuki Kudo, Yokohama (JP); Masakazu Yamagiwa, Yokohama (JP); Jun Tamura, Chuo (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/695,615

(22) Filed: Sep. 5, 2017

(65) Prior Publication Data
US 2018/0274108 A1 Sep. 27, 2018

(30) Foreign Application Priority Data
Mar. 21, 2017 (JP) ................ 2017-054565

(51) Int. Cl.
*C25B 9/08* (2006.01)
*C25B 3/02* (2006.01)
(Continued)

(52) U.S. Cl.
CPC ............ *C25B 1/04* (2013.01); *C25B 1/00* (2013.01); *C25B 1/003* (2013.01); *C25B 1/10* (2013.01);
(Continued)

(58) Field of Classification Search
CPC .. C25B 9/08; C25B 15/08; C25B 1/00; C25B 3/02; C25B 9/18
(Continued)

(56) References Cited

U.S. PATENT DOCUMENTS

2009/0104499 A1  4/2009  Sato et al.
2009/0246572 A1  10/2009  Dahlberg et al.
(Continued)

FOREIGN PATENT DOCUMENTS

JP  2009-80948   4/2009
JP  2009-540130  11/2009
(Continued)

OTHER PUBLICATIONS

Zengcai Liu, et al. "Electrochemical generation of syngas from water and carbon dioxide at industrially important rates," Journal of CO2 Utilization, 2016, vol. 15, http://dx.doi.org/10.1016/j.jcou.2016.04.011, 7 Pages.
(Continued)

*Primary Examiner* — Zulmariam Mendez
(74) *Attorney, Agent, or Firm* — Oblon, McClelland, Maier & Neustadt, L.L.P.

(57) ABSTRACT

An electrochemical reaction device comprises: an anode to oxidize water and thus generate oxygen; an electrolytic solution flow path facing on the anode and through which a first electrolytic solution containing the water flows; a a cathode to reduce carbon dioxide and thus generate a carbon compound; a separator between the anode and the cathode; a power supply connected to the anode and the cathode; and a flow path plate including a first flow path facing on the cathode and through which the carbon dioxide flows and a second flow path facing on the cathode and through which at least one of a second electrolytic solution and the carbon dioxide flows.

9 Claims, 8 Drawing Sheets

(51) Int. Cl.
  *C25B 9/18*    (2006.01)
  *C25B 1/04*    (2006.01)
  *C25B 15/02*   (2006.01)
  *C25B 15/08*   (2006.01)
  *C25B 1/00*    (2006.01)
  *C25B 1/10*    (2006.01)
  *C25B 3/04*    (2006.01)
  *C25B 9/00*    (2006.01)
  *C25B 9/04*    (2006.01)
  *C25B 9/10*    (2006.01)

(52) U.S. Cl.
  CPC .................. *C25B 3/04* (2013.01); *C25B 9/00* (2013.01); *C25B 9/04* (2013.01); *C25B 9/10* (2013.01); *C25B 15/02* (2013.01); *C25B 15/08* (2013.01); *Y02E 60/366* (2013.01)

(58) Field of Classification Search
  USPC ........................................................ 204/265
  See application file for complete search history.

(56) References Cited

U.S. PATENT DOCUMENTS

| | | |
|---|---|---|
| 2012/0292199 A1 | 11/2012 | Deguchi et al. |
| 2013/0087451 A1 | 4/2013 | Hirashige et al. |
| 2013/0186771 A1 | 7/2013 | Zhai et al. |
| 2014/0291163 A1 | 10/2014 | Kanan et al. |
| 2016/0017503 A1 | 1/2016 | Kaczur et al. |
| 2016/0145752 A1 | 5/2016 | Salehi et al. |
| 2016/0186342 A1 | 6/2016 | Ono et al. |
| 2016/0369415 A1 | 12/2016 | Masel et al. |
| 2017/0073822 A1 | 3/2017 | Kudo et al. |
| 2017/0183789 A1 | 6/2017 | Matthews et al. |

FOREIGN PATENT DOCUMENTS

| | | |
|---|---|---|
| JP | 5017499 | 9/2012 |
| JP | 2013-544957 | 12/2013 |
| WO | WO 2016/039999 A1 | 3/2016 |

OTHER PUBLICATIONS

Extended European Search Report dated Jan. 15, 2018 in European Patent Application No. 17189371.2, 8 pages.

ELECTROCHEMICAL REACTION DEVICE

CROSS-REFERENCE TO RELATED APPLICATION

This application is based upon and claims the benefit of priority from Japanese Patent Application No. 2017-054565, filed on Mar. 21, 2017; the entire contents of which are incorporated herein by reference.

FIELD

Embodiments described herein generally relate to an electrochemical reaction device.

BACKGROUND

In recent years, from the viewpoints of both energy problems and environment problems, not only converting the renewable energy such as sunlight into the electric energy to utilize it, but also converting it into a storable and conveyable state is highly desired. In response to this demand, research and development on an artificial photosynthesis technology that produces chemical substances using the sunlight like the photosynthesis by plants are in progress. This technology also creates a possibility of storing the renewable energy as a storable fuel and further, produces chemical substances to be industrial raw materials, and thereby, creation of value is also promising.

As a device that produces the chemical substances using the renewable energy such as the sunlight, there has been known an electrochemical reaction device that includes a cathode to reduce carbon dioxide ($CO_2$) from, for example, a power plant and a waste treatment plant and an anode to oxidize water ($H_2O$). The cathode reduces carbon dioxide to produce a carbon compound such as carbon monoxide (CO), for example. When such an electrochemical reaction device is fabricated by a cell form (to be also referred to as an electrolysis cell), fabricating the electrochemical reaction device by a form similar to a fuel cell such as a Polymer Electric Fuel (PEFC), for example, is considered to be effective. However, in this case, a problem similar to a problem that the PEFC has is sometimes caused.

DETAILED DESCRIPTION

An electrochemical reaction device according to an embodiment comprises: an anode to oxidize water and thus generate oxygen; an electrolytic solution flow path facing on the anode and through which a first electrolytic solution containing the water flows; a cathode to reduce carbon dioxide and thus generate a carbon compound; a separator between the anode and the cathode; a power supply connected to the anode and the cathode; and a flow path plate including a first flow path facing on the cathode and through which the carbon dioxide flows and a second flow path facing on the cathode and through which at least one of a second electrolytic solution and the carbon dioxide flows.

Hereinafter, there will be explained an embodiment with reference to the drawings. Note that the drawings are schematic and, for example, dimensions such as thickness and width of components may differ from actual dimensions of the components. Besides, in the embodiment, substantially the same components are denoted by the same reference signs and the description thereof will be omitted in some cases.

Figure 1:
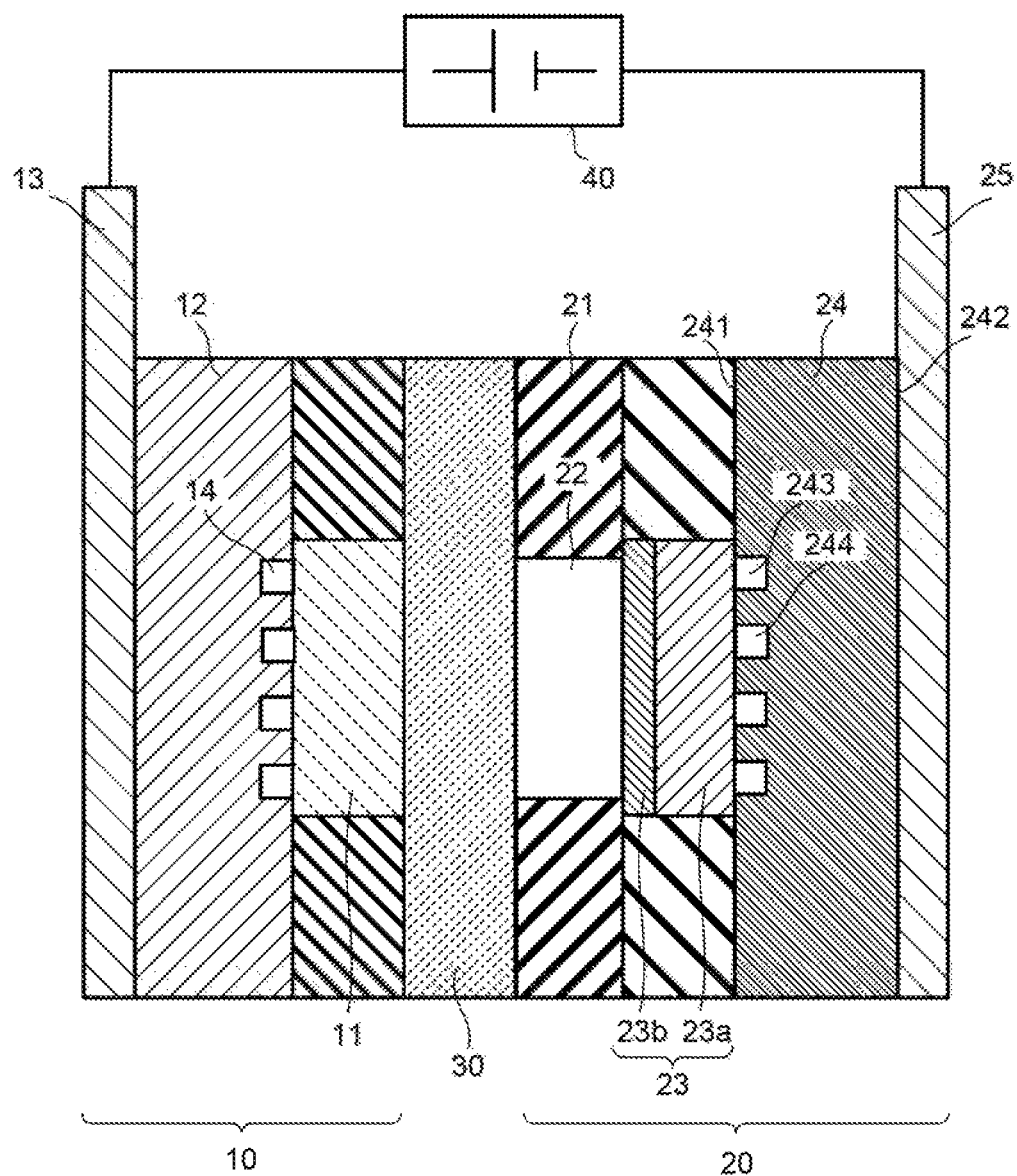
FIG. 1 is a schematic view illustrating a structure example of an electrochemical reaction device.
Figure 2:
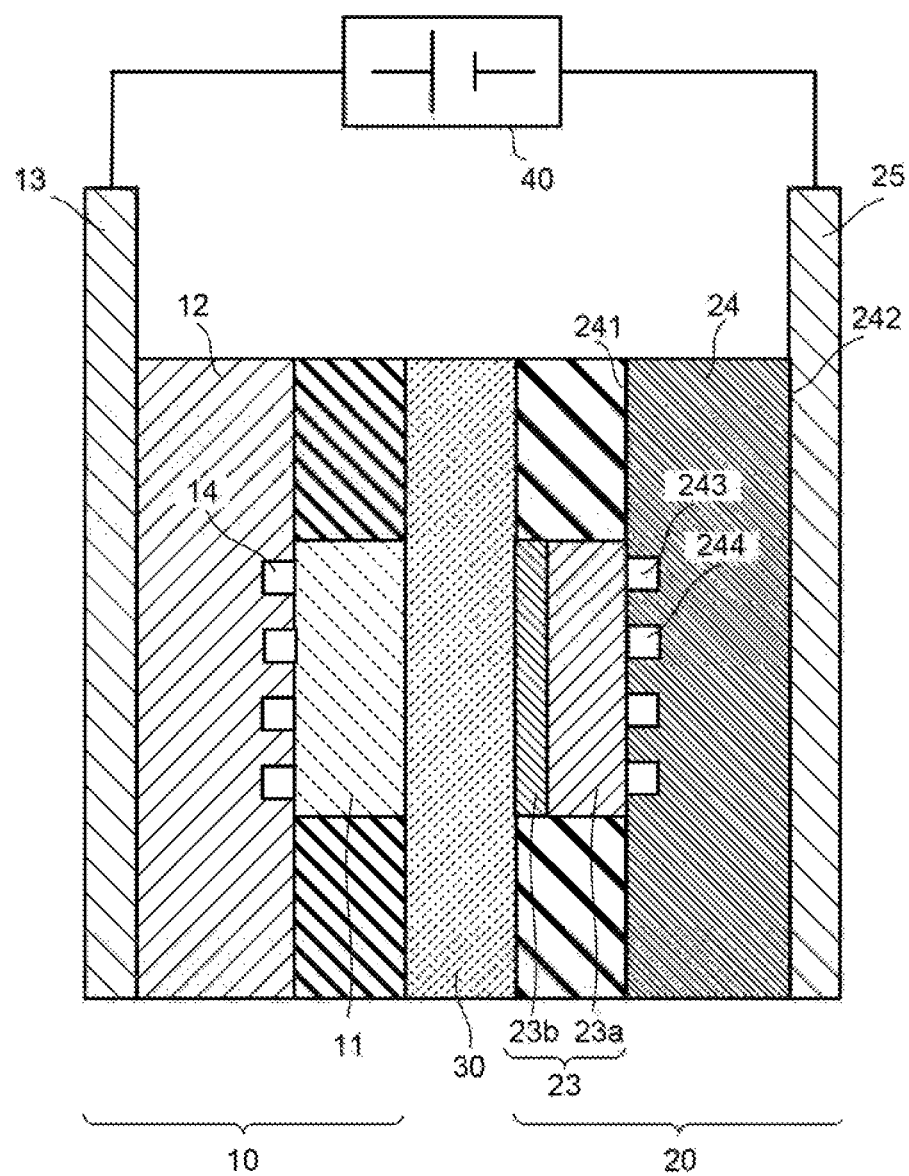
FIG. 2 is a schematic view illustrating another structure example of the electrochemical reaction device.

FIG. 1 and FIG. 2 are a schematic cross-sectional view illustrating a structure example of an electrochemical reaction device according to an embodiment. The electrochemical reaction device includes an anode part 10, a cathode part 20, a separator 30, and a power supply 40.

The anode part 10 can oxidize water ($H_2O$) to produce oxygen and hydrogen ions, or oxidize hydroxide ions (OH) to produce water and oxygen. The anode part 10 includes au anode 11, a flow path plate 12, a current collector 13 and a flow path 14.

The anode 11 is formed by supporting an oxidation catalyst on a substrate having a porous structure such as a mesh material, a punching material, a porous body, or a metal fiber sintered body, for example. The substrate may be formed of a metal such as titanium (Ti) nickel (Ni), or iron (Fe), or a metal material such as an alloy (for example, SUS) containing at least one of these metals. The anode 11 is supported by a support, or the like, for example. The support has an opening, for example, and in the opening, the anode 11 is disposed.

As the oxidation catalyst, a material that lowers activation energy for oxidizing water can be cited. In other words, a material that lowers an overvoltage when oxygen and hydrogen ions are produced through an oxidation reaction of water can be cited. For example, iridium, iron, platinum, cobalt, manganese, and so on can be cited.

Alternatively, a binary metal oxide, a ternary metal oxide, a quaternary metal oxide, or the like can be used as the oxidation catalyst. Examples of the binary metal oxide include manganese oxide (Mn—O), iridium oxide Ir—O) nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Co—O, La—Co—O, Ni—La—O, Sr—Fe—O, and so on. Examples of the quaternary metal oxide include Ph—Ru—Ir—O, La—Sr—Co—O, and so on. The oxidation catalyst is not limited to the above, and as the oxidation catalyst, a metal complex such as a Ru complex or a Fe complex can also be used. Farther, a plurality of materials may be mixed.

The flow path plate 12 has a groove facing the anode 11. The flow path plate 12 has a function as a flow path plate. As the flow path plate 12 a material having low chemical stability and high conductivity is preferably used. Examples of such a material include metal materials such as Ti and SUS, carbon, and so on.

The current collector 13 is electrically connected to the anode 11 via the flow path plate 12. The current collector preferably contains a material having low chemical reactivity and high conductivity. Examples of such a material include metal materials such as Ti and SUS, carbon, and so on.

The flow path 14 contains a space between the anode 11 and the groove in the flow path plate 12. The flow path 14 has a function as an electrolytic solution flow path for allowing a first electrolytic solution containing substances to be oxidized such as water to flow therethrough.

The cathode part 20 can reduce carbon dioxide ($CO_2$) to produce a carbon compound and hydrogen. The cathode part 20 includes a flow path plate 21, a flow path 22, a cathode 23, a flow path plate 24 including a flow path 243 and a flow path 244, and a current collector 25. As illustrated in FIG. 2, the flow path plate 21 does not need to be provided.

The flow path plate 21 has an opening having a function as the flow path 22. The flow path 22 is provided for allowing a second electrolytic solution containing water and carbon dioxide to flow therethrough. The flow path plate 21 preferably contains a material having low chemical reactivity and no conductivity. Examples of such a material include insulating materials such as an acrylic resin, polyetheretherketone (PEEK), and a fluorocarbon resin. Changing the amount of water contained in the electrolytic solution flowing through the flow path 22 and components of the electrolytic solution makes it possible to change oxidation-reduction reactivity and change selectivity of substances to be reduced and ratios of chemical substances to be produced.

At least one of the anode 11 and the cathode 23 may have a porous structure. Examples of the material applicable to an electrode layer having the porous structure include a carbon black such as ketjen black or VULCAN XC-72, activated carbon, metal fine powder, and so on, in addition to the above-described materials. The area of an activation surface that contributes to the oxidation-reduction reaction can be made large by having the porous structure, so that it is possible to increase conversion efficiency.

As a reduction catalyst, a material that lowers activation energy for reducing hydrogen ions and carbon dioxide can be cited, in other words, a material that lowers an overvoltage when hydrogen and a carbon compound are produced through a reduction reaction of hydrogen ions and carbon dioxide can be cited. For example, a metal material or a carbon material can be used. As the metal material, for example, a metal such as platinum or nickel, or an alloy containing the metal can be used in the case of the reduction reaction of hydrogen, for example. As the metal material, a metal such as gold, aluminum, copper, silver, platinum, palladium, or nickel, or an alloy containing the metal can be used in the case of the reduction reaction of carbon dioxide. As the carbon material, graphene, carbon nanotube (CNT), fullerene, ketjen black, or the like can be used, for example. The reduction catalyst is not limited to the above, and as the reduction catalyst, for example, a metal complex such as a Ru complex or a Re complex, or an organic molecule having an imidazole skeleton or a pyridine skeleton may be used. Further, a plurality of materials may be mixed.

An example of the carbon compound produced by the reduction reaction differs depending on the kind of the reduction catalyst. The compound produced by the reduction reaction is a carbon compound such as carbon monoxide (CO), formic acid (HCOOH), methane ($CR_4$) methanol ($CH_3OH$), ethane ($C_2H_6$), ethylene ($C_2H_4$), ethanol ($C_2H_5OH$), formaldehyde (HCHO), or ethylene glycol, or hydrogen, for example.

The porous structure preferably has a fine pore distribution of 5 nm or more and 100 nm or less. With the fine pore distribution, an increase in catalyst activity is enabled. Furthermore, the porous structure preferably has a plurality of fine pore distribution peaks. This can achieve all of an increase in surface area, an improvement in dispersion of ions and reactant, and high conductitvity at the same time. For example, the cathode 23 may be formed by stacking a reduction catalyst layer containing particles of a metal or an alloy applicable to the above-described reduction catalyst of 100 nm or less (a particulate reduction catalyst) on a conductive layer of the above-described material having a fine pore distribution of 5 μm or more and 10 μm or less. In this case, the particle may also have the porous structure, but does not always need to have the porous structure from the conductivity or the relationship between a reaction site and material diffusion. Further, the above-described particles may be supported by another material.

The cathode 23 includes a porous conductive layer 23a having a function as a gas diffusion layer, for example, and a reduction catalyst layer 23b stacked on the porous conductive layer 23a and containing the reduction catalyst. The porous conductive layer 23a has a carbon paper, a carbon cloth, or the like, for example. The cathode 23 is supported by a support, or the like, for example. The support has an opening, for example, and in the opening, the cathode 23 is disposed. The porous conductive layer 23a has a first surface facing the flow path 243 and the flow path 244, a second surface, and a pore portion communicating from the first surface to the second surface. An average pore size of the pore portion is preferred to be 10 μm or less.

The reduction catalyst layer 23b faces the flow path 22. The reduction catalyst layer 23b is in contact with the second surface of the porous conductive layer 23a. The reduction catalyst layer 23b has a porous conductive layer having a pore size smaller than that of the porous conductive layer 23a, for example, and the reduction catalyst supported on a surface of the porous conductive layer.

As the porous conductive layer, a mixture of Nafion and conductive particles such as ketjen black may be used, and as the reduction catalyst, a gold catalyst may be used. Further, formation of protrusions and recesses of 5 μm or less on the surface of the reduction catalyst can increase the reaction efficiency. Further, the surface of the reduction catalyst is oxidized by application of a high frequency, and then subjected to electrochemical reduction, and thereby the cathode 23 having a nanoparticle structure can be formed. Other than gold, metal such as copper, palladium, silver, zinc, tin, bismuth, or lead is preferred. Besides, the porous conductive layer may further have a stacked structure composed of layers having different pore sizes. The stacked structure having the different pore sizes makes it possible to adjust the difference in reaction due to the difference in reaction product concentration near, for example, an electrode layer, the difference in pH, or the like, by the pore sizes to improve the efficiency.

When an electrode reaction with a low current density is performed by using relatively low light irradiation energy, there is a wide range of options in catalyst material. Accordingly, for example, it is easy to perform a reaction by using a ubiquitous metal or the like, and it is also relatively easy to obtain selectivity of the reaction. When the power supply 40 formed of a photoelectric conversion body is electrically connected to at least one of the anode 11 and the cathode 23 by a wire or the like, an electrode area generally becomes small for the reason of miniaturizing an electrolytic solution tank to achieve saving, cost reduction, or the like, and the reaction is performed with a high current density in some cases. In this case, a noble metal is preferably used as the catalyst.

The electrochemical reaction device according to this embodiment is a simplified system, in which the anode 11 and the cathode 23 are integrated to reduce the number of parts. Accordingly for example, manufacture, installation, and maintainability improve.

Figure 3:
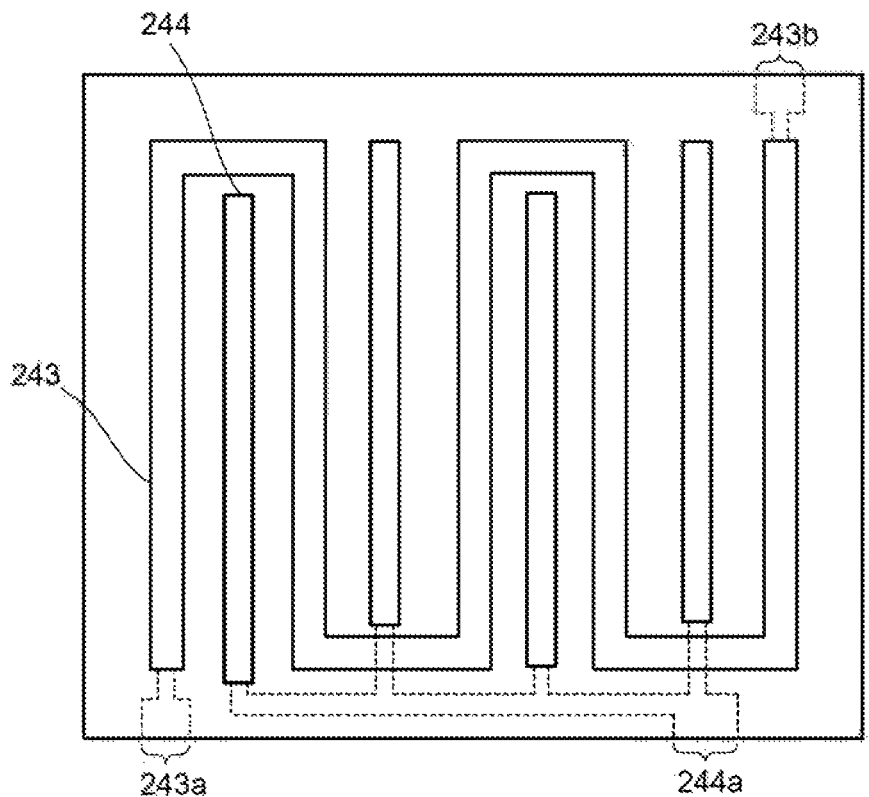
FIG. 3 is a schematic top view illustrating a structure example of a flow path plate.
Figure 4:
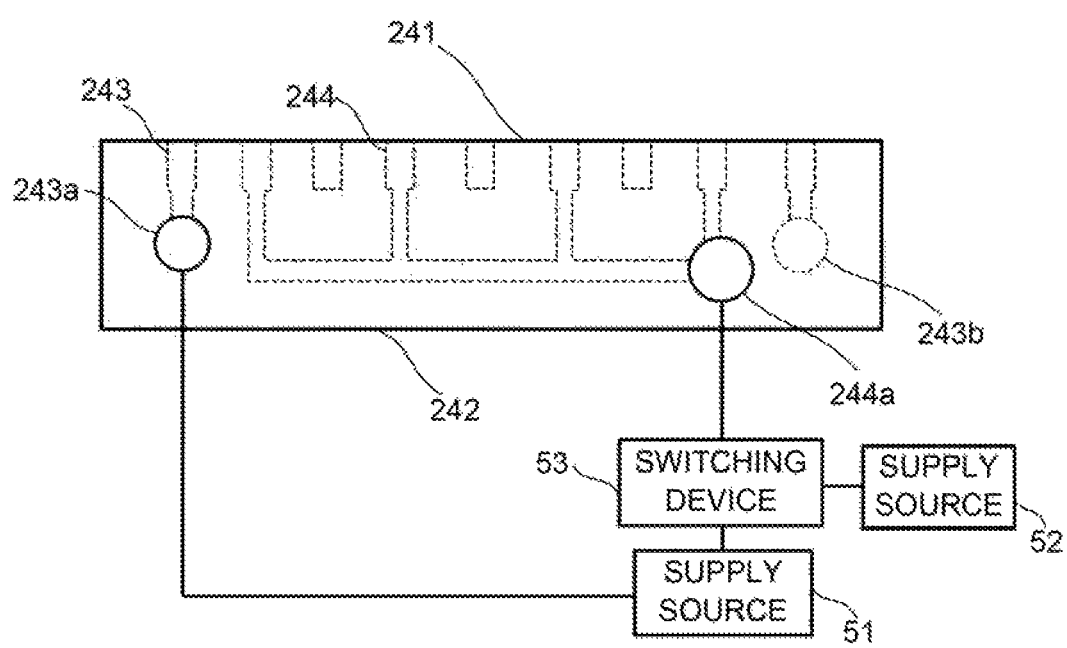
FIG. 4 is a schematic side view illustrating the structure example of the flow path plate.

FIG. 3 is a schematic top view illustrating a structure example of the flow path plate 24. FIG. 4 is a schematic side stew illustrating the structure example of the flow path plate 24. The flow path plate 24 includes a surface 241, a surface 242, the flow path 243, and the flow path 244.

The surface 241 is in contact with the porous conductive layer 23a. The surface 242 faces the surface 241, and is in contact with the current collector 25. The flow path plate 24 illustrated in FIG. 3 and FIG. 4 has a rectangular parallelepiped shape, but is not limited to this.

At least a part of the flow path 243 faces the porous conductive layer 23a. The flow path 243 includes an inlet 243a and an outlet 243b. The inlet 243a is provided in order to allow carbon dioxide to flow into the flow path 243 from the outside of the flow path plate 24 (outside of the cathode part 20). At least a part of the above-described carbon dioxide is gaseous. The outlet 243b is provided in order to allow the carbon dioxide to flow out to the outside of the flow path plate 24 (outside of the cathode part 20) from the flow path 243.

The flow path 243 illustrated in FIG. 3 extends in a serpentine shape along the surface 241. The flow path 243 is not limited to this, and may extend in a comb-teeth shape or a spiral shape along the surface 241. The flow path 243 contains spaces formed by grooves and openings provided in the flow path plate 24, for example.

At least a part of the flow path 244 faces the porous conductive layer 23a. The flow path 244 includes an inlet 244a. The inlet 244a is provided in order to allow at least one of the second electrolytic solution and the carbon dioxide to flow into the flow path 244 from the outside of the flow path plate 24 (outside of the cathode part 20). At least a part of the carbon dioxide is gaseous. Further, the second electrolytic solution may contain water, carbon dioxide, and/or the like. Further, in the cathode part 20, pressure on the second electrolytic solution is higher than that on the carbon dioxide. This makes it possible to efficiently perform gas/liquid separation. The flow path 244 may include an outlet in order to allow at least one of the second electrolytic solution and the carbon dioxide to flow out to the outside of the flow path plate 24 (outside of the cathode part 20) from the flow path 244. In the above-described formation, the flow path, 244 and the flow path 243 intersect with each other three-dimensionally.

The electrochemical reaction device according to the embodiment may include: a supply source 51 intended for supplying the gaseous carbon dioxide to at least one of the flow path 243 and the flow path 244; a supply source 52 intended for supplying the second electrolytic solution to the flow path 244; and a switching device 53 that switches between the carbon dioxide to the flow path 244 from the supply source 51 and supplying the second electrolytic solution to the flow path 244 from the supply source 52, as illustrating in FIG. 4. For example it is possible that the switching device 53 is connected to each of the supply source 51 the supply source 52, and the flow path 244 by a flow path such as a wire and the switching device 53 switches between the connection between the flow path 244 and the supply source 51 and the connection between the flow path 244 and the supply source 52. This makes it possible to alternately supply the carbon dioxide and the second electrolytic solution to the flow path 244. The switching device 53 may include control valves or the like in portions connected to the flow paths respectively.

As the first electrolytic solution and the second electrolytic solution, an aqueous solution containing, for example, $LiHCO_3$, $NaHCO_3$, $KHCO_3$, $CsHCO_3$, phosphoric acid, boric acid, or the like may be used. Further, as the first electrolytic solution and the second electrolytic solution, an aqueous solution containing, for example, an optional electrolyte can be used. Examples of the aqueous solution containing the electrolyte include aqueous solutions containing phosphoric acid ions ($PO_4^{2-}$), boric acid ions ($BO_3^{3-}$) sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), carbonate ions ($CO_3^-$, or the like. The fast electrolytic solution and the second electrolytic solution may contain substances different from each other.

Examples of anions include fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and so on. Dipolar ions in which cations and anions of an ionic liquid are coupled by hydrocarbons may be used. A buffer solution such as a potassium phosphate solution may be supplied to the flow paths.

The flow path 244 illustrated in FIG. 3 extends along the surface 241 in a comb-teeth shape. The flow path 244 is not limited to this, and may extend along the surface 241 in a comb-teeth shape or a spiral shape. The flow path 244 contains spaces formed by grooves and openings provided, in the flow path plate 24, for example.

The flow path plate 24 is preferred to be a metal plate containing a material having low chemical reactivity and high conductivity. As such a material metal plates of Ti, SUS, and so on can be cited.

The current collector 25 is in contact with the surface 242 of the flow path plate 24. The current collector 25 preferably contains a material having low chemical reactivity and high conductivity. As such a material, metal materials such as Ti and SUS, carbon, and so on can be cited.

The separator 30 is formed of an ion exchange membrane or the like that enables ions to migrate between the anode part 10 and the cathode part 20 and separation between the anode 11 and the cathode 23. The ion exchange membrane allows specific ions to pass therethrough. Examples of the ion exchange membrane include Neosepta (registered trademark) manufactured by ASTOM Corporation, Selemion (registered trademark) and Aciplex (registered trademark) manufactured by Asahi Glass Co. Ltd., Fumasep (registered trademark) and fumapem (registered trademark) manufactured by Fumatech GmbH, Nafion (registered trademark), which is a fluorocarbon resin produced through polymerization of sulfonated tetrafluoroethylene, manufactured by Du Pont, lewabrane (registered trademark) manufactured by LANXESS, IONSEP (registered trademark) manufactured by IONTECH, Mustang (registered trademark) manufactured by Pall Corporation, ralex (registered trademark) manufactured by mega a.s., Gore-Tex (registered trademark)

manufactured by W. L, Gore & Associates, and so on. Further, the ion exchange membrane may be formed of a film having a hydrocarbon basic skeleton or for anion exchange, may be formed of a film having an amine group.

When a solid electrolyte membrane is used as the electrolyte, the aforementioned Nafion, Selemion, or the like is used. Further, the electrolyte is not limited to the solid electrolyte membrane, and may be an electrolytic solution of alkali or the like. At this time, a narrow interval between the anode 11 and the cathode 23 is preferred because an electrical resistance becomes low, and further a uniform interval between the anode 11 and the cathode 23 is preferred because an electrical resistance to an electrode surface becomes uniform and the reaction efficiency becomes high. Therefore, a porous nonconductive membrane is preferably provided between the anode 11 and the cathode 23. This enables migration of the electrolyte through the porous body, the interval between the anode 11 and the cathode 23 is uniformized between several μm and several hundred μm, and separation of gas components present in the anode 11 and cathode 23 is enabled. As such a membrane, a water-repellent porous polymer such as Teflon, or a porous substance subjected to a water-repellent treatment such as Teflon is used.

When the ion exchange membrane is a proton exchange membrane, for example, migration of the hydrogen ions is enabled. Use of the ion exchange membrane being a solid polymer membrane such as Nafion can increase the migration efficiency of the ions. The ion exchange membrane is not necessarily provided, and a salt bridge such as agar may be provided in place of the ion exchange membrane, or a porous body thin film may be used.

The power supply 40 is electrically connected to the anode 11 and the cathode 23. With use of the electric energy supplied from the power supply 40, the reduction reaction by the cathode 23 and the oxidation reaction by the anode 11 are performed. For example, a wire may connect the power supply 40 and the anode 11 and connect the power supply 40 and the cathode 23. The power supply 40 includes a photoelectric conversion element a system power supply, a power supply device such as a storage battery, or a conversion unit that converts renewable energy such as wind power, water power, geothermal power, or tidal power into electric energy. For example, the photoelectric conversion element has a function of separating charges using energy of irradiating light such as sunlight. Examples of the photoelectric conversion element include a pin-junction solar cell, a pn-junction solar cell an amorphous silicon solar cell, a multijunction solar cell, a single crystal silicon solar cell, a polycrystalline silicon solar cell, a dye-sensitized solar cell, an organic thin-film solar cell, and so on.

Next, there will be explained an operation example of the electrochemical reaction device according to the embodiment. Here, the case where the electrolytic solution containing water and carbon dioxide is supplied through the flow path 243 and the gas containing carbon dioxide is supplied through the flow path 244 to produce carbon monoxide is explained as one example. In the anode part 10, as expressed by the following formula (1), the water undergoes an oxidation reaction and loses electrons, and oxygen and hydrogen ions are produced. At least one of the produced hydrogen ions migrates to the cathode part 20 through the separator 30.

$$2H_2O \rightarrow 4H^+ + O_2 + 4e^- \quad (1)$$

In the cathode part 20, as expressed by the following formula (2), the carbon dioxide undergoes a reduction reaction, and the hydrogen ions react with the carbon dioxide while receiving, the electrons, and carbon monoxide and water are produced. Further, as expressed by the following formula (3), the hydrogen ions receive the electrons, and hydrogen is produced. At this time, the hydrogen may be produced simultaneously with the carbon monoxide.

$$CO_2 + 2H^+ + 2e^- \rightarrow CO + H_2O \quad (2)$$

$$2H^+ + 2e^- \rightarrow H_2 \quad (3)$$

The power supply 40 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in the formula (1) is 1.23 [V]. The standard oxidation-reduction potential of the reduction reaction in the formula (2) is 0.03 [V]. The standard oxidation-reduction potential of the reduction reaction in the formula (3) is 0 [V]. At this time, the open-circuit voltage needs to be 1.26 [V] or more in the reactions of the formula (1) and the formula (2).

The reduction reactions of hydrogen ions and carbon dioxide are reactions consuming hydrogen ions. This means that a small amount of the hydrogen ions results in low efficiency of the reduction reaction. Therefore, the first electrolytic solution and the second electrolytic solution preferably have different hydrogen ion concentrations so that the concentration difference facilitates the migration of the hydrogen ions. The concentration of anions (for example, hydroxide ions) may be made different between the electrolytic solution on the anode side and the electrolytic solution on the cathode side. When using a cation-exchange membrane as the ion exchange membrane, cations migrate, and when using an anion-exchange membrane as the ion exchange membrane, anions migrate. Further, in order to increase the concentration difference of the hydrogen ions, a method is considered, in which an inert gas not containing carbon dioxide (nitrogen, argon, or the like) is directly blown into the electrolytic solution, for example, to let the carbon dioxide contained in the electrolytic solution go, to thereby reduce the concentration of the hydrogen ions.

The reaction efficiency of the formula (2) varies depending on the concentration of the carbon dioxide dissolved in the electrolytic solution. The higher the concentration of the carbon dioxide, the higher the reaction efficiency, and as the former is lower, the latter is lower. The reaction efficiency of the formula (2) also varies depending on the concentration of hydrogen carbonate ions or carbonate ions. However, the concentration of hydrogen carbonate ions or the concentration of carbonate ions can be adjusted by an increase in the electrolytic solution concentration or the adjustment of pH and thus is more easily adjusted than the carbon dioxide concentration. Even if the ion exchange membrane is provided between the oxidation electrode layer and the reduction electrode layer, a carbon dioxide gas, carbonate ions, hydrogen carbonate ions, and so on pass through the ion exchange membrane and thus it is difficult to completely prevent performance deterioration. As a method to increase the carbon dioxide concentration, for example, a method of blowing the carbon dioxide directly into the electrolytic solution can be considered. At this time, it is possible to increase the carbon dioxide concentration in the electrolytic solution by providing a porous body in the electrolytic solution and supplying the carbon dioxide through the porous body.

There is caused a problem that the reaction efficiency decreases because the amount of the carbon dioxide gas dissolved in the electrolytic solution is small. Thus, using an electrolytic solution, containing, for example, amine with high absorptance of carbon dioxide is considered. However, using the above electrolytic solution causes an electrolytic reaction of the amine itself and a deterioration problem, and further leads to an increase in cost.

The reduction catalyst for reducing the carbon dioxide varies in selectivity depending on the electrolyte, electrolyte membrane, or vapor pressure that is in contact therewith, and reduces the carbon dioxide to produce carbon monoxide, formic acid, ethylene, methane, and the like, but reduces protons depending on a condition to produce a large amount of hydrogen, resulting in a decrease in reduction efficiency of the carbon dioxide. This is because a proton source used for the reduction of the carbon dioxide is hydrogen ions or hydrogen carbonate ions, and the selectivity changes depending on, for example, the concentration of the hydrogen carbonate ions in the electrolytic solution or the pH. This change greatly affects the selectivity of carbon monoxide and hydrogen in a catalyst mainly using gold, and in a catalyst to perform a multielectron reduction of copper and the like, selectivities of carbon monoxide, formic acid, ethylene, methane, methanol, ethanol, formaldehyde, acetone, and so on are different from one another. Selecting the electrolytic solution becomes important for performing these controls. However, when the catalyst layer is in contact with the electrolyte membrane (or the electrolytic solution on the oxidation side) in order to reduce a cell resistance in the system of supplying the carbon dioxide gas to the reduction catalyst, the electrolytic solution is determined by compatibility with the oxidation catalyst, a cell resistance, or a balance of a composition of the electrolyte membrane, or the like with members forming the cell, so that it is difficult to select an optional electrolytic solution.

The electrochemical reaction device according to the embodiment includes a flow path plate having a first flow path and a second flow path in the cathode part. Thereby, by letting an electrolytic solution suitable for the reduction reaction flow to, for example, the second flow path to circulate the electrolytic solution suitable for a desired carbon dioxide reduced product by the reaction, selectivity of the reaction can be controlled. Further, the production is not focused only on the reduction of carbon dioxide, and carbon dioxide and hydrogen can also be produced at an arbitrary ratio in such a manner that, for example, carbon monoxide and hydrogen are produced at a ratio of 1:2, and through a chemical reaction performed thereafter, methanol is manufactured.

The second electrolytic solution to be supplied to the second flow path contains a suitable electrolyte according to each catalyst. When an electrolyte such as potassium hydroxide, for example, is used, metal ions such as potassium migrate to the anode part 10. Thereby, the electrolytic solution contains the metal ions. This becomes significant when using a cation-exchange membrane in particular. When the carbon dioxide circulates in the anode part 10, by the potassium that has migrated to the anode part 10 and the carbon dioxide, salts of potassium carbonate and potassium bicarbonate precipitate in the flow path. This phenomenon causes a problem that the flow path is blocked. Thus, letting water or the like flow through the flow path can be considered, but gas-liquid two-phase flow is generated in the flow path, the pressure in the flow path varies greatly, and stability of the cell reaction decreases, resulting in efficiency deterioration. Further, when the supply pressure of the carbon dioxide varies greatly and control is performed, the system becomes complex. Furthermore, the gas-liquid two-phase flow is generated to increase the pressure loss, and thus it is necessary to increase the supply pressure. Therefore, the energy is lost. Accordingly, it is not preferred from the viewpoints of energy and cost. Thus, providing the first flow path and the second flow path enables prevention of the precipitation of salts. When the proton source used for the reduction reaction of the carbon dioxide is hydrogen ions, sulfuric acid is preferably contained in the electrolytic solution.

At least one of the first flow path and the second flow path is a flow path intended for supplying the carbon dioxide to the reduction catalyst layer 23b and collecting products. The products at this time are carbon monoxide, methane, ethylene, and so on in a gaseous form, and formic acid, ethylene glycol, methanol, ethanol, and so on in a liquid form the shape of the flow paths is not limited in particular as long as the flow paths each have a shape having a cavity. Different flow paths may be provided according to the kinds of the products. When electrolytic solutions different from each other are made to flow through the flow paths at this time, a plurality of products can be collected at different rates. Further, the products may be extracted to be collected by connecting the flow paths to a distiller or providing a separation membrane or the like in the flow paths.

Figure 5:
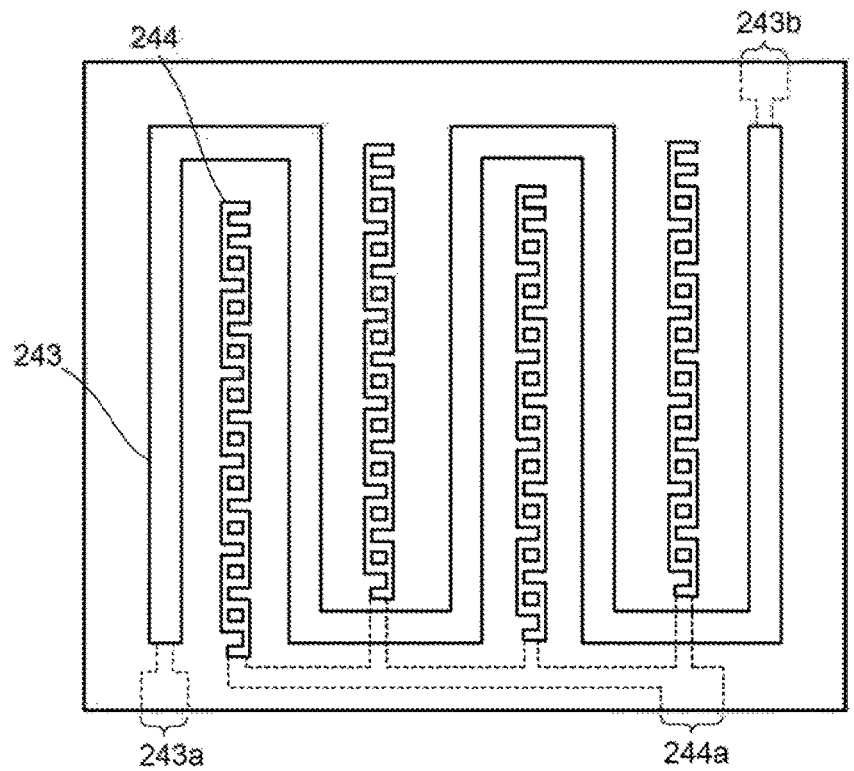
FIG. 5 is a schematic top view illustrating another structure example of the flow path plate.
Figure 6:
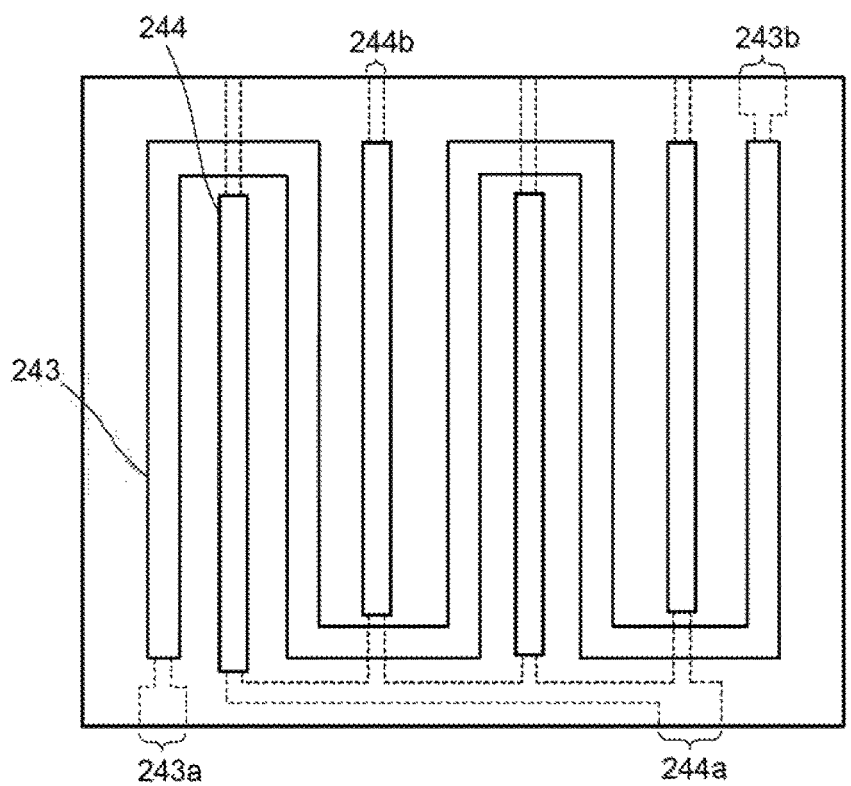
FIG. 6 is a schematic top view illustrating another structure example of the is flow path plate.
Figure 7:
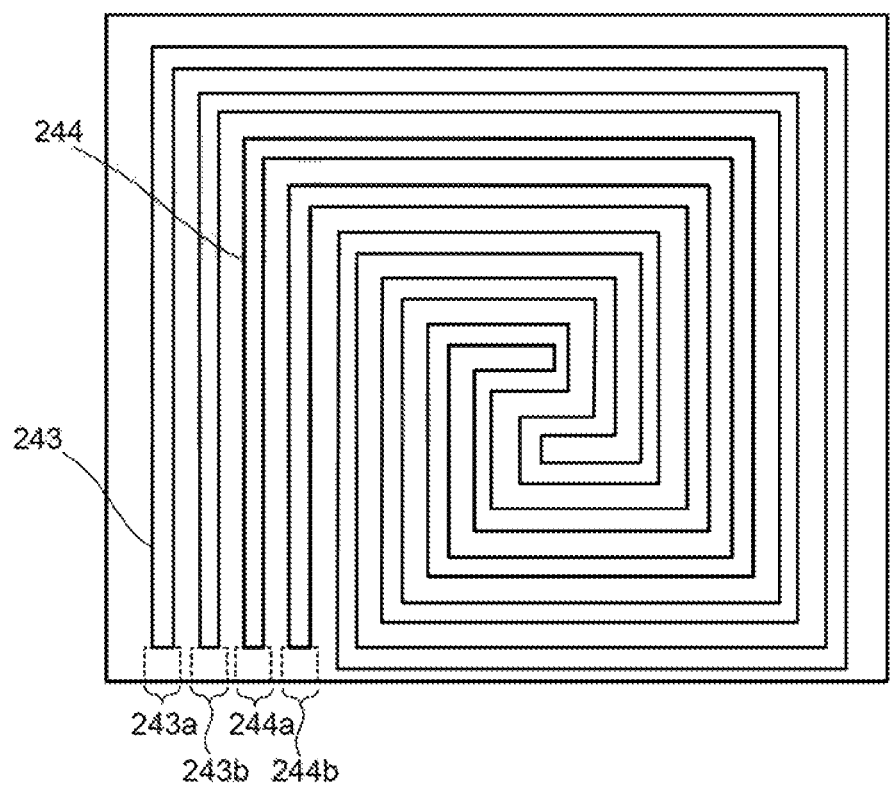
FIG. 7 is a schematic top view illustrating another structure example of the flow path plate.

The structure of the flow path plate 24 is not limited to the structure examples illustrated in FIG. 1 to FIG. 4. FIG. 5 to FIG. 7 are schematic views each illustrating another structure example of the flow path plate 24. In FIG. 5 to FIG. 7, portions common to the structures illustrated in FIG. 1 to FIG. 4 can be assisted by the explanations in FIG. 1 to FIG. 4 as necessary.

In the flow path plate illustrated in FIG. 5, at least a part of the flow path 244 extends in a serpentine shape. At this time, a part of the flow path 244 may branch off in parallel every time the flow path 244 is turned back.

The flow path plate illustrated in FIG. 6 has a formation in which the flow path 244 has an outlet 244b. The outlet 244b may be formed separately in each region where the flow path 244 branches off into a comb-teeth shape. Further, the outlet 244b may communicate with all of branch portions.

The flow path plate illustrated in FIG. 7 has a formation in which the flow path 244 has the outlet 244b and the flow path 243 and the flow path 244 each extend in a spiral shape. In this formation, the flow path 244 does not intersect with the flow path 243, thereby enabling suppression of the precipitation of salts, or the like.

Figure 8:
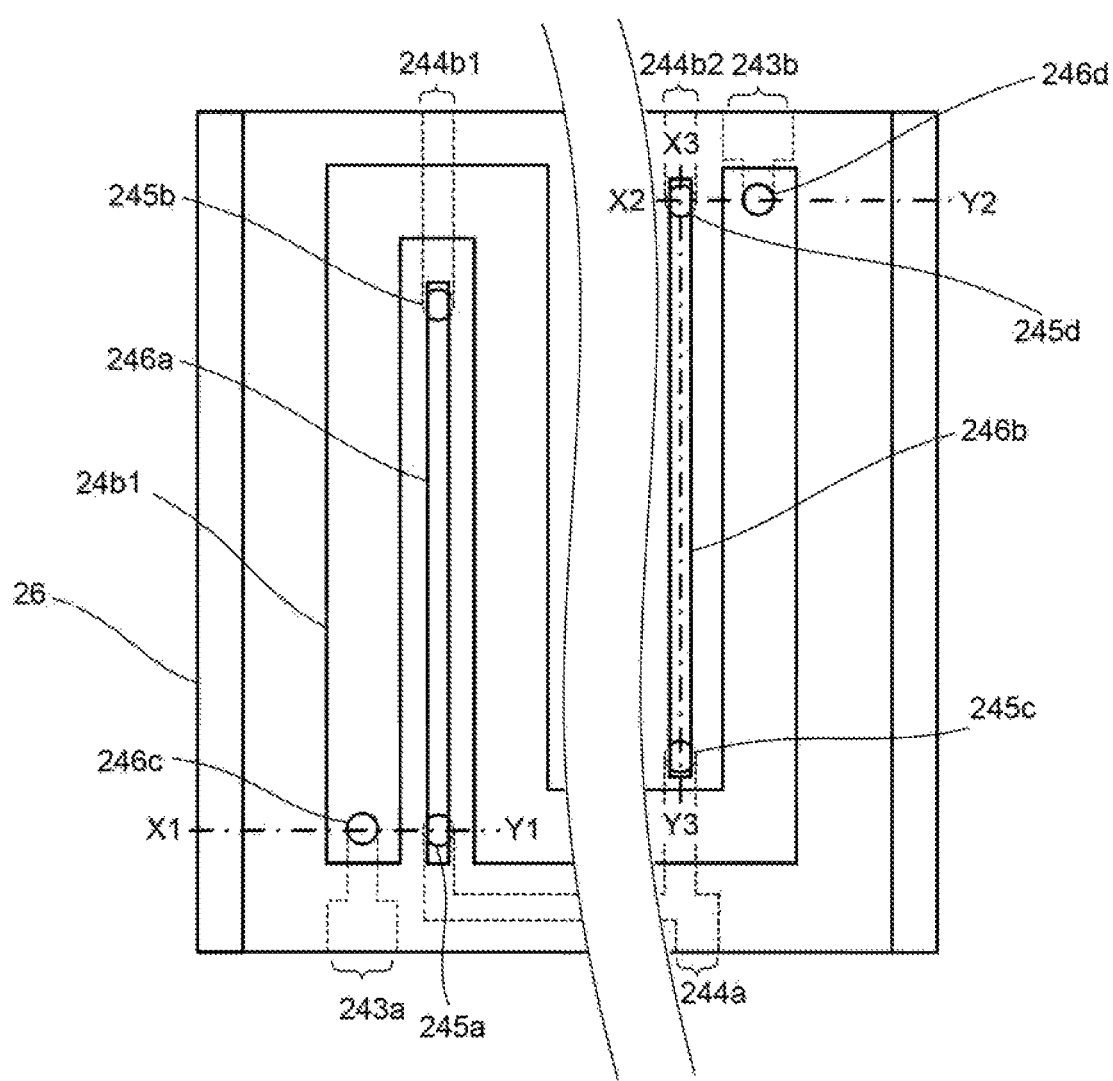
FIG. 8 is a schematic top view illustrating another structure example of the flow path plate.
Figure 9:
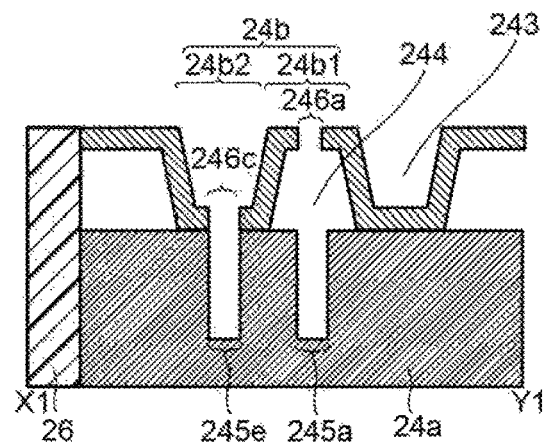
FIG. 9 is a schematic cross-sectional view illustrating another structure example of the flow path plate.
Figure 10:
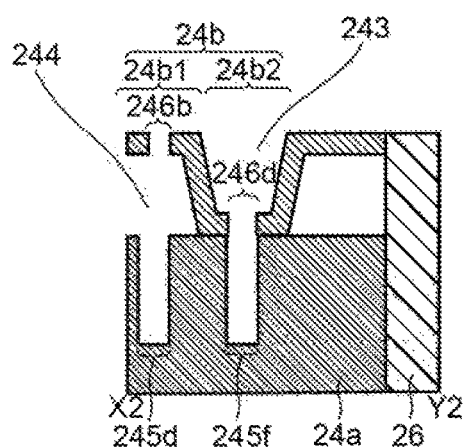
FIG. 10 is a schematic cross-sectional view illustrating another structure example of the flow path plate.
Figure 11:
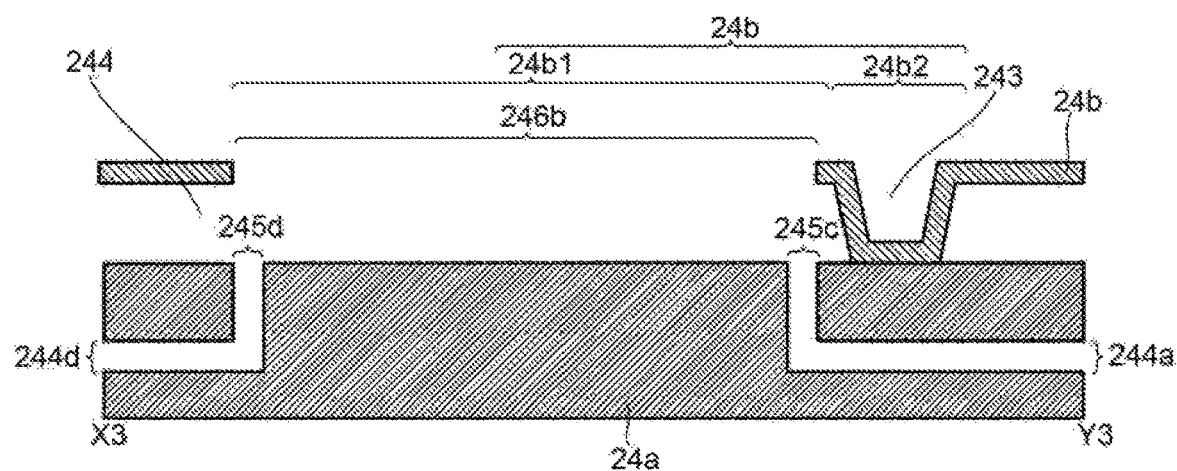
FIG. 11 is a schematic cross-sectional view illustrating another structure example of the flow path plate.

FIG. 8 is a schematic top view illustrating another example of the flow path plate 24. FIG. 9 is a schematic cross-sectional view of a line segment X1-Y1 in FIG. 8. FIG. 10 is a schematic cross-sectional view of a line segment X2-Y2 in FIG. 8. In FIG. 11 is a schematic cross-sectional view of a line segment X3-Y3 in FIG. 8. In FIG. 8 to FIG. 11, portions common to the structures illustrated in FIG. 1 to FIG. 7 can be assisted by the explanations in FIG. 1 to FIG. 7 as necessary.

The flow path plate illustrated in FIG. 8 to FIG. 11 includes a flow path laser 24a and a flow path layer 24b stacked on the flow path layer 24a. For the flow path layer 24a and the flow path layer 24b, high corrosion-resistant titanium, or the like can be used, but due to the relationship with press workability, price, or the like, working such as gold plating on a pressed plate of aluminum, SUS, or the like, conductive SUS for a high corrosion-resistant fuel cell, and the like may be used.

The flow path layer 24a includes the inlet 243a, the outlet 243b, the inlet 244a, and as the outlet 244b, outlets 244b1, 244b2, and openings 245a to 245f.

The inlet 243a, the outlet 243b, the inlet 244a, and the outlets 244b1, 244b2 are each provided to be exposed on a side surface of the flow path layer 24a.

The opening 245a penetrates the flow path layer 24a to communicate with the inlet 244a. The opening 245b penetrates the flow path layer 24a to communicate with the outlet 244b1. The opening 245c penetrates the flow path layer 24a to communicate with the inlet 244a. The opening 245d penetrates the flow path layer 24a to communicate with the outlet 244b2. The opening 245e penetrates the flow path layer 24a to communicate with the inlet 243a. The opening 245f penetrates the flow path layer 24a to communicate with the outlet 243b. The opening 245a to the opening 245f each may be formed by a groove.

The flow path layer 24b has a region 24b1 apart from the flow path layer 24a and a region 24b2 bent so as to protrude toward the flow path layer 24a from the region 24b1.

The region 24b1 has an opening 246a overlapping the opening 245a and the opening 245b and an opening 246b overlapping the opening 245c and the opening 245d. The opening 246a communicates with the inlet 244a through the opening 245a. The opening 246b communicates with the outlet 244b1 through the opening 245b.

The region 24b2 has an opening 246c and an opening 246d. The opening 246c communicates with the inflow port 243a through the opening 245e. The opening 246d communicates with the outlet 243b through the opening 245f.

In the flow path plate illustrated in FIG. 8 to FIG. 11, side surfaces of the flow path layer 24a and the flow path layer 24b are sealed by a sealing member 26. At this time, the flow path 243 contains a space between the region 24b2 and the porous conductive layer 23a of the cathode 23. The flow path 244 contains a space between the region 24b1 and the flow path layer 24a.

Figure 12:
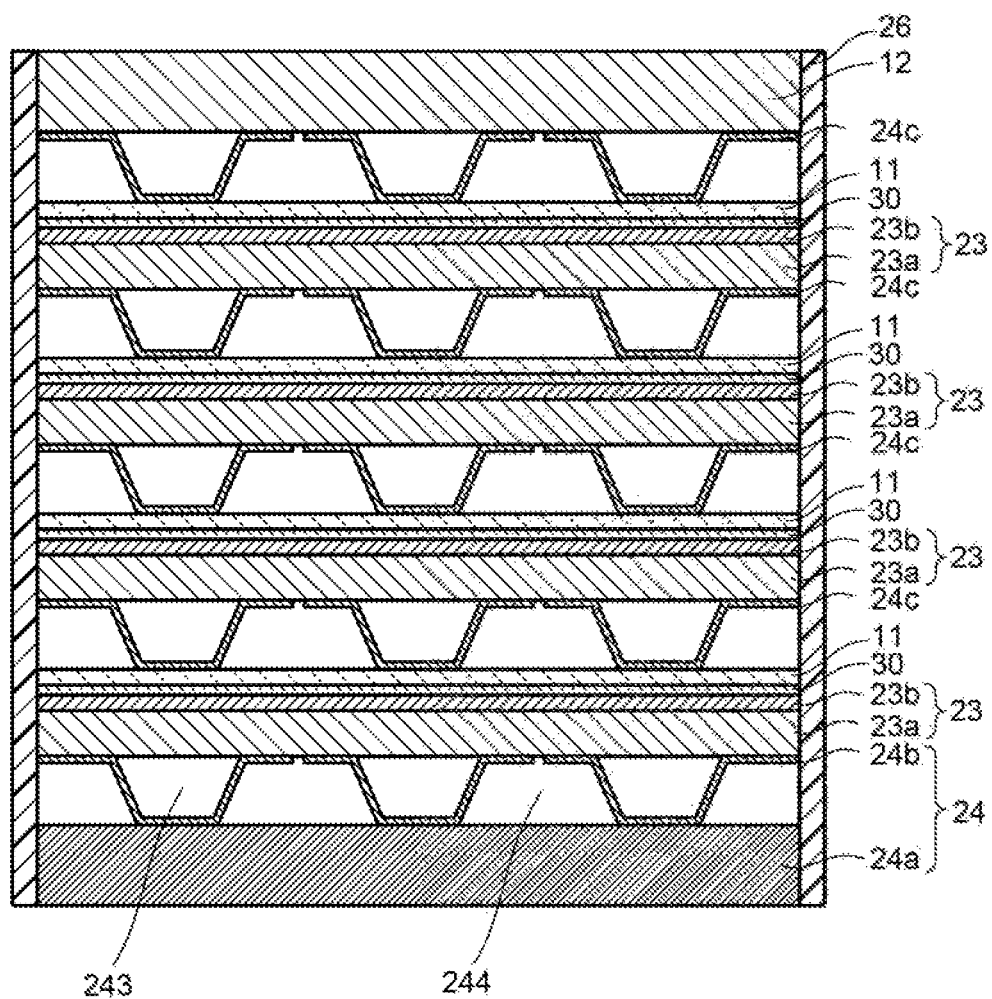
FIG. 12 is a schematic cross-sectional view illustrating another structure example of the flow path plate.

FIG. 12, is a schematic cross-sectional view illustrating another structure example of the electrochemical reaction device. The electrochemical reaction device illustrated in FIG. 12 includes a plurality of anodes 11, a flow path plate 12, a plurality of cathodes 23 each having a porous conductive layer 23a and a reduction catalyst layer 23b, a flow path plate 24 having a flow path layer 24a and a flow path layer 24b, a plurality of flow path layers 24c, a plurality of separators 30. and a sealing member 26. In FIG. 12, a plurality of units each including the anode 11, the cathode 23, the separator 30, and the flow path layer 24c are stacked. Parts common to the electrochemical reaction device explained with reference to FIG. 1 to FIG. 11 can be assisted by the explanations as necessary.

One of the anodes 11 is provided between one of the cathodes 23 and the flow path plate 12. One of the cathodes 23 is provided between the above-described one of the anodes 11 and one of the flow path plates 24c. One of the separators 30 separates the above-described one of the anodes 11 from the above-described one of the cathode 23. One of the flow path layers 24c is provided between another of the cathodes 23 and the above-described one of the anodes 11. Farther, though not illustrated, the plural anodes 11 and the plural cathodes 23 are electrically connected to a power supply 40.

The flow path plate 12 may be electrically connected to the power supply 40 via a current collector 13 similarly to the electrochemical reaction device illustrated in FIG. 1, for example. The porous conductive layer 23a faces the flow path layer 24c. The reduction catalyst layer 23b faces the separator 30.

The flow path layer 24a may be electrically connected to the power supply 40 via a current collector 25 similarly to the electrochemical reaction device illustrated in FIG. 1, for example. The flow path layer 24b is stacked on the flow path layer 24a. For the flow path layer 24c, a flow path layer having the same structure as the flow path layer 24a, for example, can be used. Further, the electrochemical reaction device illustrated in FIG. 12 may have a structure in which the openings 246c, 246d of the flow path layer 24a are not provided and the region 24b2 extends to an end portion of the flow path layer 24c. At this time, carbon dioxide or an electrolytic solution may be directly supplied to the flow path 243 and the flow path 244 from the end portion of the flow path layer 24c. The flow path layer 24c is also referred to as a bipolar plate. Further, the sealing member 26 seals a stack of the above-described units.

In the electrochemical reaction device illustrated in FIG. 12, an electrolytic solution on the anode 11 side and an electrolytic solution on the cathode 23 side can be made common, and further flow paths through which the electrolytic solution flows can be made common. For example, the same flow path layer 23c can be used as the flow path on the anode 11 side and the flow path on the cathode 23 side, and can also be used as a liquid flow path to the cathode 23 side by having openings formed therein like the aforementioned flow path. Such a formation is preferred because the contact resistance between the anode 11 and the cathode 23 is reduced to improve the efficiency. Further, this formation is good because a cost reduction and a reduction in size and weight can be achieved by reducing the number of parts.

EXAMPLE

Examples 1

An electrochemical reaction device in this example was fabricated as follows. An anode was formed by forming an oxidation catalyst containing an iridium oxide on a surface of a titanium-made wire mesh having a mesh structure by an etching method, further, a cathode was fabricated by spraying 23 wt % of gold-carrying carbon onto a stack composed of a first porous conductive layer and a second porous conductive layer formed of a carbon paper to fabricate a catalyst layer-attached carbon paper with a gold-carrying amount being 0.2 mg/cm$^2$. The carbon paper and the iridium oxide-attached titanium metal wire were stacked with an ion exchange membrane (Nafion 115.6 cm square) provided therebetween to prepare a structure (catalyst area 400 mm$^2$).

A flow path plate on the cathode side was formed of conductive titanium. The flow path plate on the cathode side includes a first flow path and a second flow path. The first flow path faces the carbon paper and extends so as to make four turnbacks. The first flow path is provided so as to make a turnback along a part of the second flow path. The second flow path is parallel to a part of the first flow path. At least a part of the first and second flow paths branches off into two paths in parallel. The second flow path has a width equal to or less than half the width of the first flow path. A flow path plate on the anode side was formed of conductive titanium. The flow path plate on the anode side faces the titanium metal wire and extends so as to make four turnbacks. The above-described structure was held sandwiched between the flow path on the anode side and the flow path on the cathode side to assemble the the electrochemical reaction device.

As an electrolytic solution, a 1.0 M aqueous potassium hydroxide solution was supplied to the flow path on the anode side at a flow rate of 0.6 sccm. A carbon dioxide gas was supplied to the first flow path on the cathode side at a flow rate of 7 sccm, and a pure water was supplied to the second flow path on the cathode side at a flow rate of 0.7 sccm. A 2.4 V voltage was applied between the anode and the cathode to collect gas generated from the cathode side, to then measure conversion efficiency of the carbon dioxide. The generated gas was sampled and the quantity of the gas was identified and determined by gas chromatography. A current to flow to the cathode side at this time and its current density, and each partial current of produced hydrogen and carbon monoxide were measured by an ammeter. Results are illustrated in Table 1.

Example 2

In the electrochemical reaction device in Example 1, measurement and the like were performed under the same condition as in Example 1 except that as the electrolytic solution on the cathode side, a 0.5 M aqueous potassium carbonate solution was used. Results are illustrated in Table 1.

Example 3

In the electrochemical reaction device in Example 1, measurement and the like were performed under the same condition as in Example 1 except that as the electrolytic solution on the cathode side, a 0.5 M aqueous potassium carbonate solution in which carbon dioxide was dissolved until saturation was used. Results are illustrated in Table 1.

Comparative Example 1

In the electrochemical reaction device in Example 1, measurement and the like were performed under the same condition as in Example 1 except that a flow path plate without the second flow path provide in the flow path plate on the cathode side was used and only a carbon dioxide gas was supplied to the first flow path. Results are illustrated in Table 1.

In Comparative example 1, a 100 mA current flowed, and the cell was disassembled after a three-hour reaction to then recognize crystals of salt of the potassium bicarbonate or potassium hydrogen carbonate in the flow path. On the other hand, in Examples 1 to 3, the cell was observed after a three-hour reaction to recognize no crystals of salt. This reveals that forming the first flow path and the second flow path in the flow path plate on the cathode side enables suppression of precipitation of salt. Accordingly, it is possible to improve the reaction efficiency of the electrochemical reaction device.

In Example 1, a selection ratio of the hydrogen and the carbon monoxide was 0.86 (86%) of hydrogen and 0.14 (14%) of carbon monoxide, while in the potassium carbonate in Example 2, the hydrogen was 0.6 (66%) and the carbon monoxide was 0.34 (34%). Further, in the aqueous potassium carbonate solution in which carbon dioxide was dissolved in Example 3, the hydrogen was 0.47 (47%) and the carbon monoxide was 0.53 (53%). This reveals that using the solution containing hydrogen carbonate ions rather than water as the electrolytic solution on the cathode side makes it possible to improve the reduction performance of carbon dioxide. Further, the aqueous potassium carbonate solution in which carbon dioxide was dissolved in Example 3 was higher in the reduction performance of carbon dioxide. This can be recognized also by the result of the partial current. These ratios and tendencies vary depending on a catalyst, and changing the catalyst and a solution component makes it possible to change a product.

TABLE 1

| | Electrolytic Solution | Selection Ratio | | Cathode-Side Current | | Partial Current [mA] | |
|---|---|---|---|---|---|---|---|
| | | $H_2$ | CO | mA | mA/cm$^2$ | $H_2$ | CO |
| Example 1 | $H_2O$ | 0.86 | 0.14 | 70 | 17.5 | 12.6 | 2.1 |
| Example 2 | $K_2CO_3$ | 0.66 | 0.34 | 105 | 26.3 | 16.3 | 8.4 |
| Example 3 | satCO$_2$ $K_2CO_3$ | 0.47 | 0.53 | 120 | 30.0 | 12.6 | 14.4 |
| Comparative Example 1 | KOH | 0.64 | 0.36 | 100 | 25.0 | 9.96 | 5.5 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device, comprising:
   an anode to oxidize water and thus generate oxygen;
   an electrolytic solution flow path facing on the anode and through which a first electrolytic solution containing the water flows;
   a cathode to reduce carbon dioxide and thus generate a carbon compound;
   a separator between the anode and the cathode;
   a flow path plate including a first flow path facing on the cathode and through which the carbon dioxide flows and a second flow path facing on the cathode and through which at least one of a second electrolytic solution and the carbon dioxide flows; and
   a third flow path facing on the cathode between the cathode and the separator and through which at least one of the second electrolytic solution and the carbon dioxide flows.

2. The device according to claim 1, wherein a part of the carbon dioxide is gaseous.

3. The device according to claim 1, wherein the second electrolytic solution contains the carbon dioxide.

4. The device according to claim 1,
wherein the cathode includes:
a porous conductive layer having a first surface facing on the first and second flow paths, a second surface, and a pore portion through which the first and second surfaces communicates with each other; and
a reduction catalyst layer on the second surface, and
wherein an average pore size of the pore portion is 10 µm or less.

5. The device according to claim 1,
wherein the first electrolytic solution contains a metal ion.

6. The device according to claim 1,
wherein a pressure on the second electrolytic solution is higher than a pressure on the carbon dioxide.

7. An electrochemical reaction device, comprising:
an anode to oxidize water and thus generate oxygen;
an electrolytic solution flow path facing on the anode and through which a first electrolytic solution containing the water flows;
a cathode to reduce carbon dioxide and thus generate a carbon compound;
a separator between the anode and the cathode;
a flow path plate including a first flow path facing on the cathode and through which the carbon dioxide flows and a second flow path facing on the cathode and through which at least one of a second electrolytic solution and the carbon dioxide flows;
a first supply source to supply the carbon dioxide to at least one of the first and second flow paths;
a second supply source to supply the second electrolytic solution to the second flow path; and
a switching device to switch between supply of the carbon dioxide from the first supply source to the second flow path and supply of the second electrolytic solution from the second supply source to the second flow path.

8. An electrochemical reaction device, comprising:
an anode to oxidize water and thus generate oxygen;
an electrolytic solution flow path facing on the anode and through which a first electrolytic solution containing the water flows;
a cathode to reduce carbon dioxide and thus generate a carbon compound;
a separator between the anode and the cathode; and
a flow path plate including a first flow path facing on the cathode and through which the carbon dioxide flows and a second flow path facing on the cathode and through which at least one of a second electrolytic solution and the carbon dioxide flows,
wherein the flow path plate includes:
a first flow path layer having a first inlet, a first outlet, a second inlet, and a second outlet; and
a second flow path layer having a first region apart from the first flow path layer and a second region bent so as to protrude toward the first flow path layer from the first region,
the first region has a first opening communicating with the first inlet and a second opening communicating with the first outlet,
the second region has a third opening communicating with the second inlet and a fourth opening communicating with the second outlet,
the first flow path includes a space between the second region and the cathode, and
the second flow path includes a space between the first region and the first flow path layer.

9. The device according to claim 8, further comprising:
a second anode disposed between the cathode and the flow path plate and connected to a power supply;
a second cathode disposed between the second anode and the flow path plate and connected to the power supply;
a second separator between the second anode and the second cathode; and
a third flow path layer disposed between the cathode and the second anode and having a third flow path facing on the cathode and a fourth flow path facing on the second anode, wherein the third flow path layer has:
a third region apart from the second anode and a fourth region bent so as to protrude toward the second anode from the third region,
the third region has a fifth opening penetrating the third flow path layer,
the third flow path includes a space between the fourth region and the cathode, and
the fourth flow path includes a space between the third region and the second anode.

* * * * *